Sept. 24, 1940.  H. S. FULLERTON  2,215,958

FATIGUE TESTING MACHINE

Filed April 27, 1938  3 Sheets-Sheet 1

INVENTOR
HERBERT S. FULLERTON
BY
ATTORNEY

Sept. 24, 1940.   H. S. FULLERTON   2,215,958
FATIGUE TESTING MACHINE
Filed April 27, 1938   3 Sheets-Sheet 2

INVENTOR
HERBERT S. FULLERTON
BY
ATTORNEY

Sept. 24, 1940. H. S. FULLERTON 2,215,958
FATIGUE TESTING MACHINE
Filed April 27, 1938 3 Sheets-Sheet 3

INVENTOR
HERBERT S. FULLERTON
BY
ATTORNEY

Patented Sept. 24, 1940

2,215,958

UNITED STATES PATENT OFFICE 2,215,958

FATIGUE TESTING MACHINE

Herbert S. Fullerton, Philadelphia, Pa., assignor, by mesne assignments, to The Baldwin Locomotive Works, a corporation of Pennsylvania Application April 27, 1938, Serial No. 204,644

6 Claims. (Cl. 265—13)

This invention relates generally to materials testing apparatus and more particularly to an improved fatigue testing machine.

A great many arrangements have heretofore been proposed and used in an attempt to provide a pulsating load for a test specimen in either tension or compression. However, such arrangements have been excessively costly, complicated or inconvenient and hence they have not been considered entirely satisfactory.

It is an object of my invention to provide an improved fatigue testing apparatus that is relatively simple and yet is rugged, compact, convenient and economical in operation and maintenance together with having maximum accuracy and flexibility such as is required in apparatus of this type.

A further object is to provide an improved fatigue testing apparatus that is readily applicable to existing and standard types of materials testing machines with little or no alteration thereto and without impairing the use of such a machine for straight tension or compression tests.

Other objects and advantages will be more apparent to those skilled in the art from the following description of the accompanying drawings in which.

Figure 1:
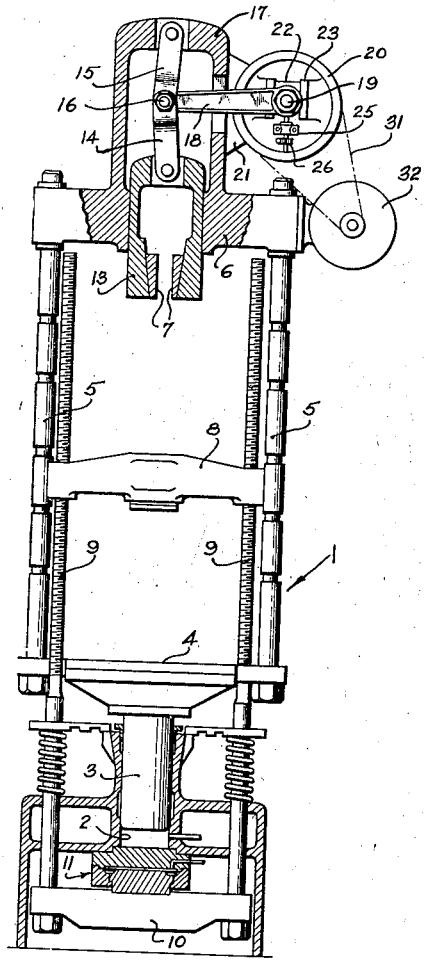
Fig. 1 is a vertical section of one form of materials testing machine with my fatigue testing apparatus applied thereto.
Figure 4:
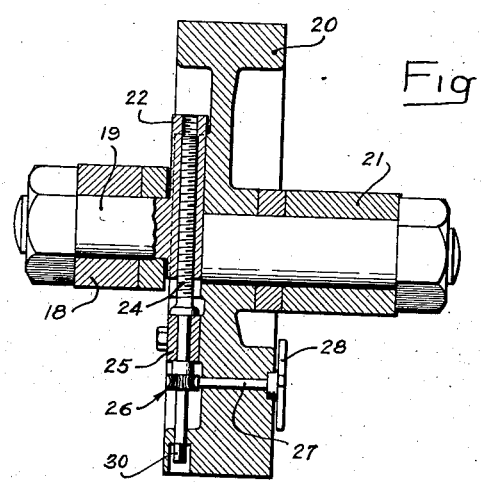
Fig. 4 is a vertical section of the flywheel taken substantially on the line 4—4 of Fig. 2.

In the particular embodiments of the invention, such as are disclosed herein merely for the purpose of illustrating certain specific forms among possible others that the invention might take in practice, I have shown a conventional type of hydraulically operated testing machine generally indicated at 1. This type of machine is disclosed in Emery Patent 1,848,468 although it will be apparent from the disclosure herein that any suitable other type of tension and/or compression testing machine may be employed. For purposes of illustration, however, the hydraulic machine disclosed herein has a main cylinder 2 and a load producing ram 3 which is moved by fluid pressure from a suitable pump. The ram carries a loading frame comprising a platform 4, side rods 5, 5 and an upper crosshead 6. Suitable grips generally indicated at 7 engage the upper end of a tension specimen while a lower crosshead 8 has grips to engage the lower end of the specimen. The crosshead 8 is mounted upon a sensitive frame 9 which carries a lower crosshead 10 acting upwardly on a hydraulic weighing support 11. The load applied to the specimen may be determined by measuring the fluid pressure in the main cylinder 2 although in accordance with said Emery patent a more accurate weighing of the load is obtained by determining the pressure in the hydraulic support 11.

Figure 6:
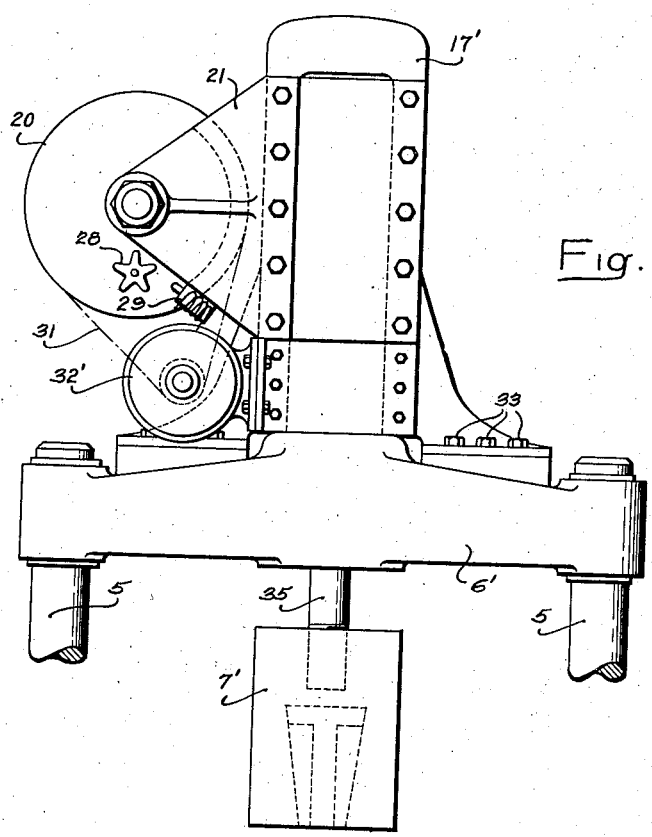
Fig. 6 is an elevational view of the back side of Fig. 2, that is, the right side of Fig. 5.
Figure 5:
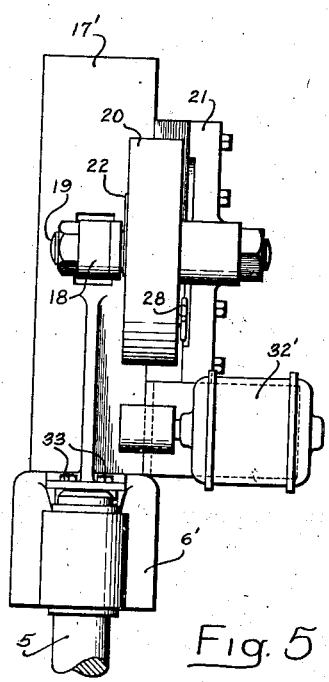
Fig. 5 is a side view of Fig. 2 taken from the right side thereof.
Figure 7:
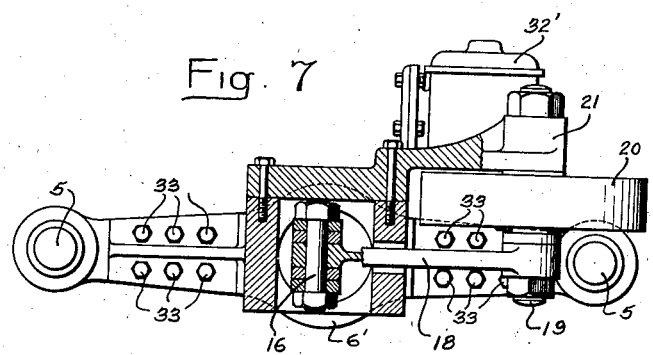
Fig. 7 is a horizontal section taken on the line 7—7 of Fig. 2.

To impose a pulsating load on a tension specimen, the grips 7, Fig. 1, are formed in a suitable vertically movable crosshead 13 slidably guided in crosshead 6 of the main loading frame. A pair of toggle links 14 and 15 are pivotally connected together by a central toggle pin 16 and are also respectively pivoted to member 13 and to a movable loading frame 17 formed integrally with crosshead 6. A connecting rod 18 is journalled at one end on toggle pin 16 and at its other end on a crank arm 19. This crank arm is radially slidably supported on a suitable flywheel 20 journalled in a suitable bracket 21 which is connected to or suitably formed with loading frame 17. The crank arm 19 is formed integrally with a base 22 which is slidably supported in a suitable guideway 23 formed on the outer face of flywheel 20. A screw 24 is threaded in member 22 and is journalled in, and held against axial movement by, a suitable bearing 25 secured to flywheel 20. This screw can be rotated in any suitable manner such as having worm and worm gear elements generally indicated at 26 one of which is secured to screw shaft 24 and the other to a transverse shaft 27 journalled in flywheel 20. A star wheel 28 is secured to the inner end of shaft 27 so as to be bodily rotatable with flywheel 20. A solenoid 29 shown in detail in the modification of Fig. 6 is secured to bracket 21 whereby upon energization of the solenoid its plunger is moved outwardly into the path of star wheel 28 to engage one arm thereof during each revolution of the flywheel and accordingly rotate a worm and worm gear 26 and screw 24 thereby to move crank arm 19 outwardly. When the desired extent of crank throw is obtained, the solenoid 29 is deenergized to permit withdrawal of its plunger from the path of star wheel 28. The extent of crank throw will determine the amount of pulsating load imposed upon the specimen through the action of toggle links 14 and 15. To initially assemble the crank throw and screw, a wrench may be applied to a lower squared end 30 of screw 24.

The flywheel 20 may be driven by a belt 31 and an electric motor 32 which is suitably secured to crosshead 6 as shown in Fig. 1. However, if it is desired to provide a self-contained pulsating unit adapted to be bodily placed upon a crosshead 6' of an existing testing machine, the motor 32' may be supported upon a movable loading frame 17' which is built as a separate unit and bolted as at 33 to the top surface of crosshead 6'. This crosshead is provided with a usual grip recess 34 which in this case is used as an opening through which a rod 35 extends from a crosshead 13'. A tension grip head 7' is threadedly secured to rod 35. The remaining structure and mode of operation are identical to that shown in Fig. 1.

Figure 8:
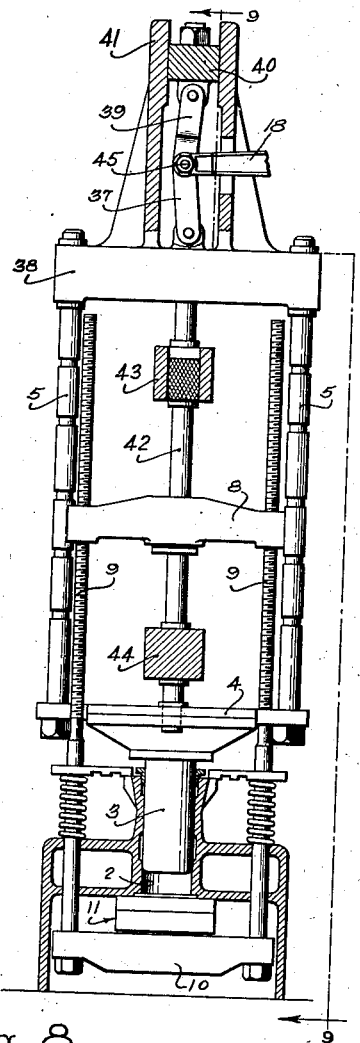
Fig. 8 is a vertical section similar to Fig. 1 but showing a modified arrangement of the toggle links and pulsating frame operated thereby, the actuating motor and power transmitting elements being omitted for clarity.
Figure 9:
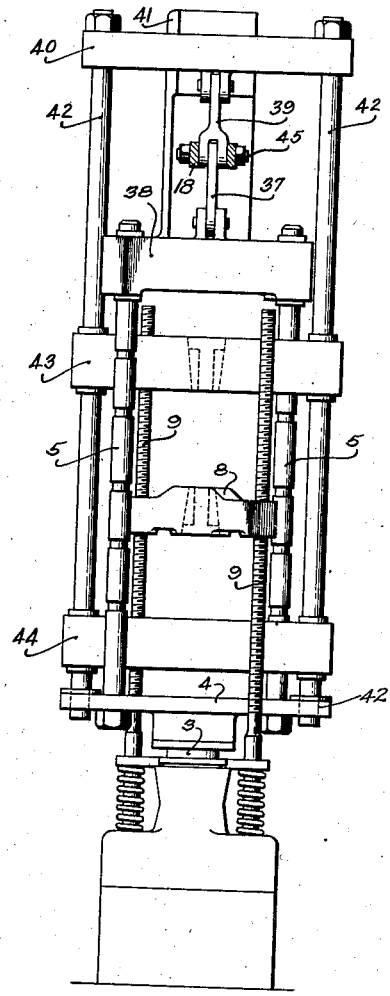
Fig. 9 is a vertical section taken on the line 9—9 of Fig. 8.

In the modification shown in Figs. 8 and 9, the lower end of toggle link 37 has a stationary pivot on the upper crosshead 38 of the main testing machine loading frame corresponding to crosshead 6 or 6'. The upper end of a toggle link 39 is pivotally connected to a vertical reciprocable crosshead 40 which is vertically guided in the upper end of a loading frame 41 corresponding to frame 17. As shown in Fig. 9, the crosshead 40 extends laterally of frame 41 and carries a pair of load transmitting rods 42 whose lower ends are slidably guided at 42' in platform 4. A grip crosshead 43 is secured to these rods to engage the upper end of the tension specimen while the lower end of these rods carries a crosshead 44 for engaging a compression specimen. This arrangement permits a pulsating load to be applied to a specimen in either tension or compression. This modification has the further advantage that the center toggle link pin 45 moves toward its dead center position as the pulsating frame 42, 43 and 44 moves upwardly to apply an increasing load on the specimen. This allows a minimum power force to be applied to the toggle mechanism at the moment when the greatest loading force is applied as it is well known that toggle links produce a maximum force when approaching their dead center position.

Figure 2:
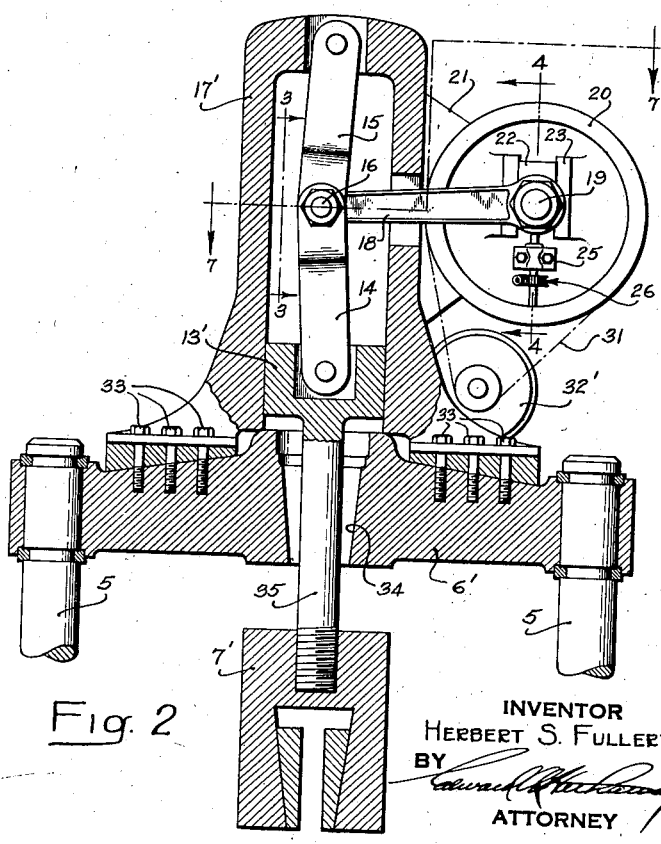
Fig. 2 is an enlarged sectional view of the upper end of the materials testing machine shown in Fig. 1 and with my improved fatigue testing apparatus shown as a self-contained unit adapted to be directly applied to the testing machine.
Figure 3:
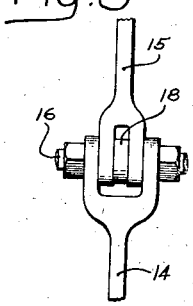
Fig. 3 is a side elevation of the operating toggle links taken substantially on the line 3—3 of Fig. 2.
Figure 10:
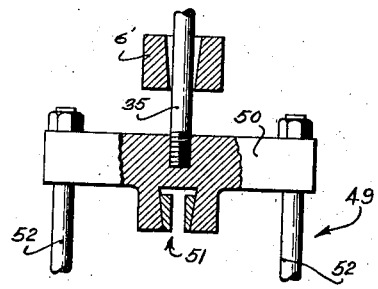
Fig. 10 is a fragmentary side elevation of a pulsator frame for tension and compression tests as applied to the types of machines shown in Figs. 1 and 2.

The modification shown in Fig. 10 simply substitutes a pulsating frame 49 for the tension grip head 7' of Fig. 2. This pulsating frame has a crosshead 50 carrying a tension grip 51 and side rods 52. These side rods in turn carry a lower crosshead corresponding to 44 of Figs. 8 and 9, thereby to allow a compression test to be made. The remaining testing machine structure would be identical to that described in the other forms. Also the operating motor and control apparatus, omitted from Fig. 10, are identical to that of the other forms.

In operation of any of the various forms disclosed it is preferable to apply an initial main load on the specimen by supplying fluid pressure to the main loading cylinder 2 thereby raising the testing machine loading frame 5, 6 and crosshead 6 together with the tension grips 7 or the compression platforms above described. When an initial base load has been applied to the specimen as indicated by usual indicating dials, the pulsating motor 32 can then be operated at any desired speed to cause vertical reciprocation of grip head 13 or 7'. Pulsating loads are consequently superimposed upon the base load of the specimen. As the specimen elongates it may be desired to increase the throw of crank arm 19 which is accomplished merely by closing the simple electrical circuit for solenoid 29. The solenoid plunger thereupon moves into the path of star wheel 28 to cause the same to be rotated during rotation of flywheel 20. Rotation of the star wheel causes rotation of screw 24 with consequent outward radial movement of the crank arm. This will either maintain a given pulsating load on the specimen or increase the pulsating load to a desired extent.

From the foregoing it is seen that my improved pulsating apparatus is adapted to be used either in existing or nearly built testing machines and also has a high degree of ruggedness and flexibility of operation together with accuracy in application of load.

It will of course be understood that various changes in details of construction and arrangement of parts may be made by those skilled in the art without departing from the spirit of the invention as set forth in the appended claims.

I claim:

1. The combination in a materials testing machine comprising a plurality of means for respectively engaging the opposite ends of a specimen, a movable loading frame carrying a crosshead for movably supporting one of said specimen engaging means, means for moving said frame to impose an initial load on said specimen, toggle links connected to and bodily movable with said crosshead and also connected to said movable specimen engaging means, a rotatable crank supported by said crosshead, and a connecting rod between said crank and toggle links to effect oscillation thereof with consequent reciprocation of said movable specimen engaging means whereby a pulsating load is superimposed on the initial load of said specimen.

2. The combination set forth in claim 1 further characterized by the provision of means for radially adjustably supporting said crank, and means supported by and movable with said crosshead for effecting radial adjustment of said crank during rotation thereof.

3. A materials testing machine comprising, in combination, a main movable loading frame having side rods and a crosshead, a plurality of means for respectively engaging the opposite ends of a specimen under test, one of said specimen engaging means being movably supported by said crosshead, means connected to and bodily movable with said movable cross-head for reciprocating said movable specimen engaging means to impose a pulsating load on a specimen, power means supported by said crosshead for effecting said reciprocable movement of the specimen engaging means, and loading means for moving said frame and its cross-head to impose an initial load on the specimen.

4. A materials testing machine comprising, in combination, a main movable loading frame having side rods and a cross-head, a plurality of means for respectively engaging the opposite ends of a specimen under test, one of said specimen engaging means being movably supported by said cross-head, means connected to and bodily movable with said movable cross-head for relatively moving said specimen engaging means to impose a pulsating load on a specimen, a main ram and cylinder for moving said loading frame and its cross-head to impose an initial load on the specimen, and a load weighing system including a hydraulic support connected to one of the specimen engaging means for determining the initial and pulsating loads applied to a specimen.

5. A materials testing machine comprising, in combination, a main cylinder, a ram therein having lower and upper cross-heads connected by side rods to provide a loading frame, a sensitive weighing frame having a lower cross-head disposed adjacent said main cylinder beneath the same and an upper cross-head disposed intermediately of said loading frame cross-heads, a hydraulic support disposed in a plane between the lower end of said main cylinder and the lower sensitive cross-head adjacent thereto, said intermediate sensitive cross-head having specimen engaging means, means for engaging the other end of a specimen adjacent the upper cross-head of the loading frame, and pulsating means carried by and movable with said upper loading frame cross-head for imposing a pulsating load on the specimen after it is initially loaded by said main ram and cylinder through said loading frame.

6. A materials testing machine comprising, in combination, a main cylinder, a ram therein having lower and upper cross-heads connected to side rods to provide a loading frame, a sensitive weighing frame having a lower cross-head disposed adjacent said main cylinder beneath the same and an upper cross-head disposed intermediately of said loading frame cross-head, a hydraulic support disposed in a plane between the lower end of said main cylinder and the lower sensitive cross-head adjacent thereto, said intermediate sensitive cross-head having specimen engaging means, a pulsating frame having side rods supporting a specimen engaging cross-head disposed on one side of said intermediate cross-head, and means carried by and movable with the upper loading frame cross-head and connected to said pulsating frame for effecting continuous reciprocation thereof.

HERBERT S. FULLERTON.